(12) United States Patent
Riley (10) Patent No.: US 10,219,502 B2
(45) Date of Patent: Mar. 5, 2019

(54) FISHING WEIGHT ASSEMBLY

(71) Applicant: Russell L. Riley, Remus, MI (US)

(72) Inventor: Russell L. Riley, Remus, MI (US)

(*) Notice: Subject to any disclaimer, the term of this patent is extended or adjusted under 35 U.S.C. 154(b) by 577 days.

(21) Appl. No.: 14/549,637

(22) Filed: Nov. 21, 2014

(65) Prior Publication Data

US 2016/0143260 A1    May 26, 2016

(51) Int. Cl.
*A01K 95/00* (2006.01)
*A01K 95/02* (2006.01)
*A01K 97/00* (2006.01)

(52) U.S. Cl.
CPC .............. *A01K 95/00* (2013.01); *A01K 95/02* (2013.01); *A01K 97/00* (2013.01)

(58) Field of Classification Search
CPC ........ A01K 85/00; A01K 85/16; A01K 91/03; A01K 91/04; A01K 95/00; A01K 95/02; A01K 97/00
USPC ........... 43/42.06, 42.08, 42.11, 42.15, 42.35, 43/42.36, 42.49, 43.1, 43.12, 44.9
See application file for complete search history.

(56) References Cited

U.S. PATENT DOCUMENTS

| | | | |
|---|---|---|---|
| 290,154 A | 12/1883 | Vidal | |
| 1,232,167 A * | 7/1917 | Arnold | A01K 93/00 24/600.4 |
| 1,250,053 A | 12/1917 | Tukey | |
| 1,359,618 A | 11/1920 | Oliver | |
| 2,470,861 A * | 5/1949 | Prentice | A01K 85/02 43/35 |
| 2,588,720 A * | 3/1952 | Heiland | A01K 85/14 43/42.5 |
| 2,741,057 A * | 4/1956 | Morris | A01K 85/16 43/42.06 |
| D186,775 S * | 12/1959 | Spencer | 43/43.1 |
| 3,077,049 A * | 2/1963 | Ward | A01K 95/00 43/44.9 |
| 3,180,052 A | 4/1965 | Malesko | |
| 3,574,265 A * | 4/1971 | Gibbons | A01K 85/16 43/35 |
| 3,740,803 A * | 6/1973 | Arteburn | A01K 95/00 24/482 |
| 3,771,252 A | 11/1973 | Odenwald | |
| D346,005 S * | 4/1994 | Franks | D22/126 |
| D346,848 S * | 5/1994 | Wenger | D22/126 |
| 5,327,670 A * | 7/1994 | Tallerico | A01K 85/10 43/42.06 |
| D401,666 S | 11/1998 | Lee | |
| D401,997 S | 12/1998 | Lee | |
| 6,691,450 B2 * | 2/2004 | Glavinich | A01K 91/04 43/4.5 |

(Continued)

FOREIGN PATENT DOCUMENTS

GB    2078472 A  *  1/1982  ............. A01K 95/00

*Primary Examiner* — Lisa L Tsang
(74) *Attorney, Agent, or Firm* — Harness, Dickey & Pierce, P.L.C.

(57) ABSTRACT

A fishing weight assembly includes a weight member and a support member. The weight member may include a proximal end, a distal end, and an aperture extending from and between the proximal and distal ends. The fishing weight support member may be disposed within the aperture and may include a base portion extending from the distal end of the fishing weight member, and an arm portion extending from the proximal end of the fishing weight member.

20 Claims, 4 Drawing Sheets

(56) References Cited

U.S. PATENT DOCUMENTS

| | | | |
|---|---|---|---|
| 8,695,180 B2* | 4/2014 | Delle Donne | A01K 91/04 24/580.1 |
| 9,125,390 B1* | 9/2015 | Kreamalmyer | A01K 85/00 |
| 2004/0134119 A1* | 7/2004 | Glavinich | A01K 95/02 43/44.87 |
| 2007/0089352 A1* | 4/2007 | Hergott | A01K 85/00 43/42.11 |
| 2011/0047857 A1* | 3/2011 | Miller | A01K 85/02 43/44.97 |

* cited by examiner

FISHING WEIGHT ASSEMBLY

FIELD

The present disclosure relates to a fishing weight assembly.

BACKGROUND

This section provides background information related to the present disclosure and is not necessarily prior art.

Fishing weights or sinkers are often attached to a fishing line to control various aspects and characteristics of a fishing lure after the fishing lure is placed in the water. For example, fishing weights can be used to control the speed at which a fishing lure descends below the surface of the water. Fishing weights can also be used to control the depth below the surface of the water at which the fishing lure travels.

It may be desirable to provide a fishing weight or a fishing weight assembly that improves the ability to remove and/or replace the fishing lure from the fishing line. While known fishing weights and fishing weight assemblies have proven useful for their intended purposes, a continued need for improvement in the relevant art remains.

SUMMARY

This section provides a general summary of the disclosure, and is not a comprehensive disclosure of its full scope or all of its features.

In accordance with a first aspect of the present disclosure, a fishing weight assembly is provided. The fishing weight assembly includes a weight member and a support member. The weight member may include a proximal end, a distal end, and an aperture extending from and between the proximal and distal ends. The support member may be disposed within the aperture and may include a base portion extending from the distal end of the weight member, and an arm portion extending from the proximal end of the weight member.

In some configurations, the arm portion may include a first arm extending from a first end of the base portion, and a second arm extending from a second end of the base portion.

In some configurations, the first and second arms may be at least partially disposed in the aperture such that a U-shaped portion of the first arm and a U-shaped portion of the second arm extend from the proximal end of the fishing weight member.

In some configurations, an end of the first arm abuts the proximal end of the fishing weight member.

In some configurations, a fishing line may be coupled to the arm portion of the fishing weight support member.

In some configurations, a lure may be coupled to the base portion of the fishing weight support member.

In some configurations, the fishing weight member may include a substantially corrugated outer surface.

In some configurations, the corrugated outer surface may include a first peak defining a first diameter and a second peak defining a second diameter greater than the first diameter.

In some configurations, the first peak may be adjacent the proximal end of the fishing weight member and the second peak may be adjacent the distal end of the fishing weight member.

In some configurations, the distal end of the fishing weight member may include a counterbore portion aligned with the aperture.

In accordance with another aspect of the present disclosure a fishing weight assembly kit is provided. The fishing weight assembly kit includes a first fishing weight member, a second fishing weight member, and a fishing weight support member. The first fishing weight member may include a first proximal end, a first distal end, and a first aperture extending from and between the first proximal and distal ends. The first proximal and distal ends may define a first length there between. The fishing weight support member may be disposed within the aperture and may include a base portion extending from the distal end of the fishing weight member, and an arm portion extending from the proximal end of the fishing weight member.

In accordance with yet another aspect of the present disclosure a fishing weight member is provided. The fishing weight member may extend from a proximal end to a distal end along a central axis. The fishing weight member may include an aperture extending from the first proximal end to the distal end, and an outer surface having a substantially corrugated pattern. The corrugated pattern may include a first corrugation disposed at the proximal end of the fishing weight member and a second corrugation disposed at the distal end of the fishing weight member. The first corrugation may define a first diameter, and the second corrugation may define a second diameter that is greater than the first diameter.

In accordance with yet another aspect of the present disclosure, a fishing weight assembly is provided. The fishing weight assembly may include a first fishing weight member, a second fishing weight member, a first fishing weight support member, and a second fishing weight support member. The first fishing weight member may include a first proximal end, a first distal end, and a first aperture extending from and between the first proximal and first distal ends. The second fishing weight member may include a second proximal end, a second distal end, and a second aperture extending from and between the second proximal and second distal ends. The first fishing weight support member may be disposed within the first aperture and may include a first base portion extending from the first distal end of the first fishing weight member, and a first arm portion extending from the first proximal end of the first fishing weight member. The second fishing weight support member may be disposed within the second aperture and may include a second base portion extending from the second distal end of the second fishing weight member, and a second arm portion extending from the second proximal end of the second fishing weight member. The second base portion may be coupled to the first arm portion of the first fishing weight support member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
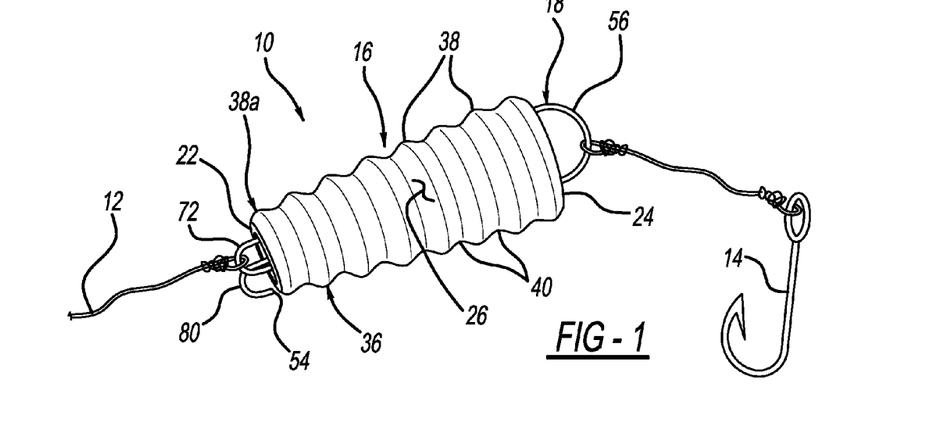
FIG. 1 is a perspective view of a fishing weight assembly in accordance with the principles of the present disclosure.
Figures 2, 3:
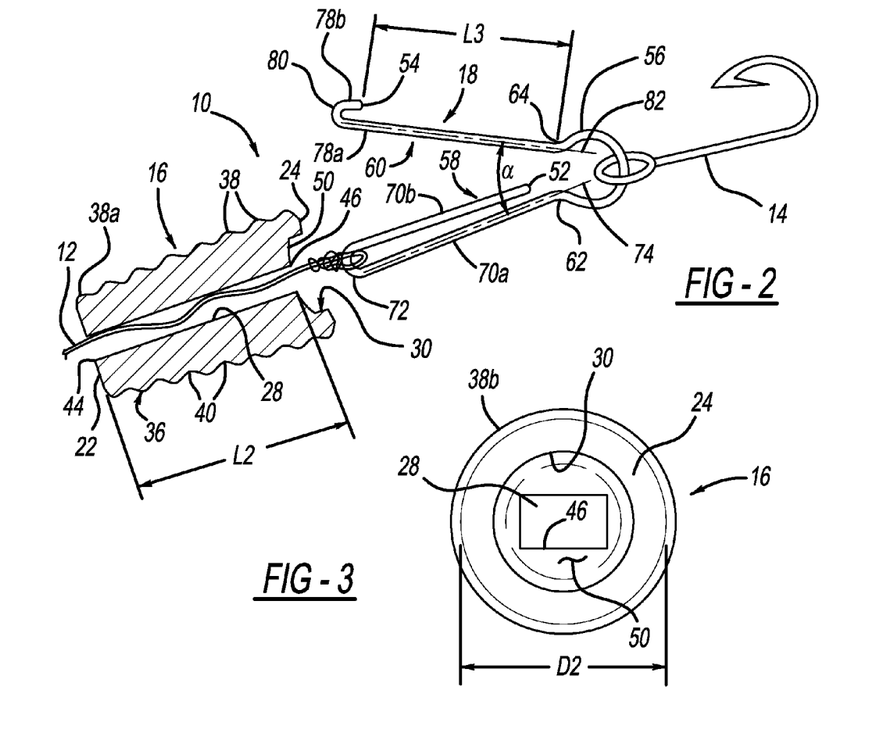
FIG. 2 is a cross-sectional view of the fishing weight assembly of FIG. 1 in a partially exploded configuration.
FIG. 3 is a top side view of a first end of a fishing weight of the fishing weight assembly of FIG. 1.

With reference to FIGS. 1 and 2, a fishing weight assembly is provided and identified at reference numeral 10. The fishing weight assembly 10 may be used with various types of fishing rod (now shown) and fishing reel (combinations). By way of example only, the fishing weight assembly 10 may be used with bait-casting reels, spinning reels, fly fishing reels, downriggers, and other suitable fishing equipment. In this regard, the fishing weight assembly 10 may be coupled to, and used to control the depth of a fishing line 12 and/or a fishing hook 14 as the line 12 and/or the hook 14 travel through a body of water.

Figures 9, 10:
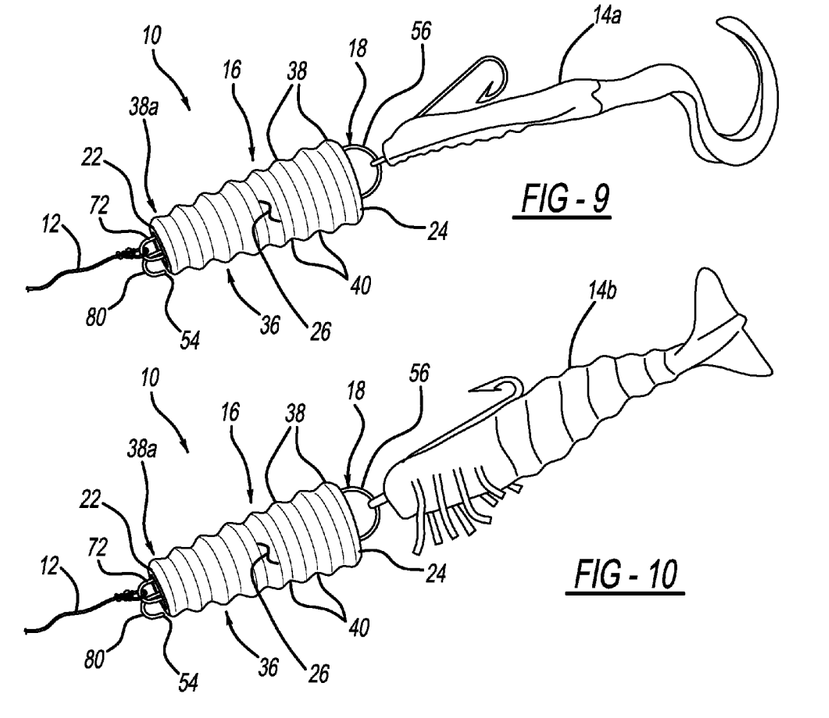
FIG. 9 is a perspective view of a fishing weight assembly used with a fishing lure.
FIG. 10 is a perspective view of a fishing weight assembly used with a second fishing lure.

Additionally, the fishing weight assembly can be used in the same manner in combination with fishing lures, 14A and 14B, such as those shown in FIGS. 9 and 10.

The fishing weight assembly 10 may include a weight member 16 and a clip member 18. As illustrated, and will be explained in more detail below, in an assembled configuration the weight member 16 may be removably coupled to and supported by the clip member 18.

The weight member 16 may include a first or proximal end 22, a second or distal end 24, an outer surface 26, and a bore or aperture 28, and a recess or counterbore 30. The weight member 16, including the outer surface 26 and the aperture 28, may extend along a longitudinal axis 32 from and between the proximal and distal ends 22, 24. In this regard, the weight member 16 may define a length L1 from the proximal end 22 to the distal end 24 along the axis 32. In some configurations, the proximal end 22 may define a generally circular shape having a diameter D1 and the distal end 24 may define a generally circular shape having a diameter D2 that is greater than the diameter D1. While the change in dimensions (e.g., tapering) from the second end to the first end offers numerous advantages such as allowing the weight to more readily cut through the water, limit snagging and better simulate live bait traversing through the water, it will be appreciated that the proximal and distal ends 22, 24 may define other shapes (e.g., oval, oblong, rectangular, etc.) within the scope of the present disclosure. In this regard, a cross-sectional area of the distal end 24 may be greater than a cross-sectional area of the proximal end 22, where the cross-sectional areas of the proximal and distal ends 22, 24 are taken in a plane extending generally perpendicular to the axis 32.

Figure 6:
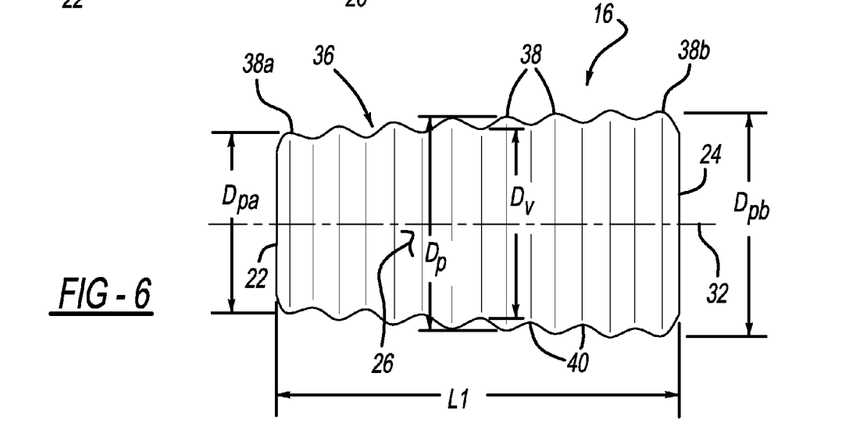
FIG. 6 is a side elevation view of the fishing weight of FIG. 3.

The outer surface 26 and the aperture 28 may be concentrically disposed about the axis 32, such that the weight member 16 includes a substantially symmetrical construct relative to the axis 32. The outer surface 26 may include a generally wavy or corrugated pattern 36 extending from and between the proximal and distal ends 22, 24, including or otherwise be defined by a series of corrugations or peaks 38 having varying maximum diameters Dp, and valleys 40 having varying minimum diameters Dv. In this regard, the peaks 38 and valleys 40 may alternate such that the peaks 38 are adjacent to the valleys 40, and vice versa. With reference to FIG. 6, a first peak 38a having a maximum outer diameter Dpa may be adjacent to the proximal end 22. A second peak 38b having a maximum outer diameter Dpb may be adjacent to the distal end 24. A series of peaks 38 having varying maximum diameters Dp may be disposed between the first and second peaks 38a, 38b. As illustrated, the diameter Dpa may be smaller than the diameters Dpb and Dp, such that the diameters Dpa, Dpb, Dp define a generally tapered or frustoconically shaped profile. In this regard, the diameters Dp of the intermediate peaks 38 may increase in a direction extending from the proximal end 22 to the distal end 24 along the axis 32. The ratio of the diameter Dpb to the diameter Dpa may be between 1.2:1 and 3:1. In some configurations, the ratio of the diameter Dpb to the diameter Dpa may be substantially equal to 1.5:1

Figure 4:
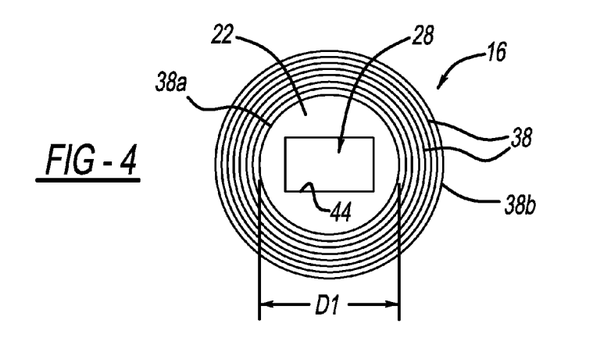
FIG. 4 is a bottom side view of a second end of the fishing weight of FIG. 3.
Figure 5:
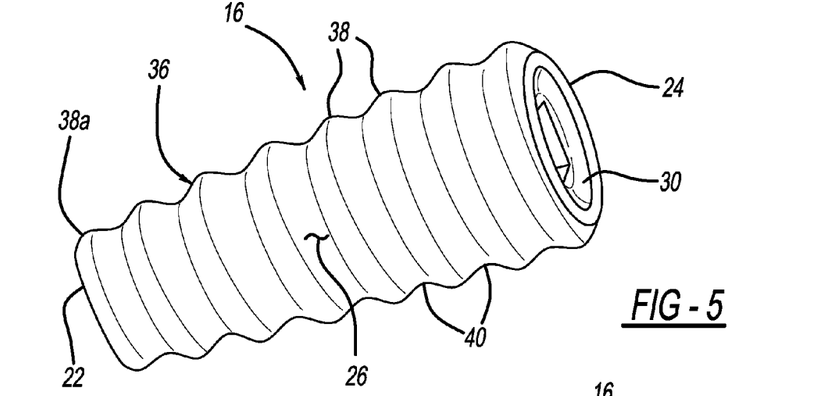
FIG. 5 is a perspective view of the fishing weight of FIG. 3.

With reference to FIGS. 3 and 4, the aperture 28 may be a through-hole having a proximal opening 44 in the proximal end 22, and a distal opening 46 in the distal end 24. In some configurations, the aperture 28 may have a generally rectangular shape extending along the axis 32. It will be appreciated, however, that the aperture 28 may include other shapes (e.g., circular, oblong, square, etc.) within the scope of the present disclosure.

The counterbore 30 may be formed in the distal end 24 of the weight member 16, and may include or otherwise be defined by a surface 50. As illustrated in FIGS. 2 and 3, in some configurations, the surface 50 may include a generally spherical shape or profile. It will be appreciated, however, that the shape of the surface 50 may include other configurations within the scope of the present disclosure. The counterbore 30 may be concentrically located relative to the distal end 24 and the aperture 28. The surface 50 and the proximal end 22 of the weight member 16 may define a length L2 along the axis 32.

In some configurations, the weight member 16 may be formed from a metallic material such as lead or steel. In this regard, the weight member 16 may be formed from a material having a density greater than the density of water. It will be appreciated, however, that the weight member may be formed from any suitable material within the scope of the present disclosure.

The clip member 18 may extend from a first end 52 to a second end 54, and may include a base portion 56, a first branch or arm 58 and a second branch or arm 60. The base portion 56 may be integrally formed with the first and second arms 58, 60, and may define a substantially C-shaped construct extending from a first end 62 to a second end 64. The C-shaped base portion is sized to be larger than the weight member operative 28, but will generally partially seat within the counterbore 30 and extend beyond the distal end of the weight member to provide an oversized loop. The oversized loop allows a lure, such as those shown in FIGS. 9 and 10 to move on the loop to simulate the movement of live bait. In some configurations, the base portion 56 and the first and second arms 58, 60 may define a monolithic construct. In this regard, the clip member 18 may be formed from a resilient or otherwise flexible material, such as spring steel, for example, such that the first arm 58 can be biased relative to the second arm 60, and vice versa.

The first arm 58 may include a first portion 70a and a second portion 70b. The first and second portions 70a, 70b may define a substantially U-shaped or hooked construct, including a first bend 72. The first portion 70a may extend in a first direction from the first end 62 of the base portion 56 to the first bend 72 along a second axis 74. The second portion 70b may extend in a second direction, generally opposite the first direction, from the first bend 72 to the first end 52 of the clip member 18, such that the second portion 70b is disposed between the first portion 70a and the second arm 60. In this regard, the second portion 70b may extend in a direction substantially parallel to the second axis 74.

The second arm 60 may include a first portion 78a and a second portion 78b. The first and second portions 78a, 78b may define a substantially U-shaped or hooked construct, including a second bend 80. The first portion 78a may extend in a first direction from the second end 64 of the base portion 56 to the second bend 80 along a third axis 82. As illustrated, the second and third axes 74, 82 define an angle α there between. The angle α may be between five degrees and forty degrees, for example. In some configurations, the angle α may be substantially equal to about twenty degrees. In this regard, the first and second arms 58, 60 may define a substantially V-shaped construct. The second portion 78b of the second arm 60 may extend in a second direction, generally opposite the first direction of the first portion 78a, from the second bend 80 to the second end 54 of the clip member 18, such that the first portion 78a is disposed between the second portion 78b and the first arm 58. In this regard, the second portion 78b may extend in a direction substantially parallel to the third axis 82. The second end 54 of the clip member 18 and the second end 64 of the base portion 56 may define a length L3. The length L3 may be substantially equal to the length L2 defined by the surface 50 and the proximal end 22 of the weight member 16.

Figure 7:
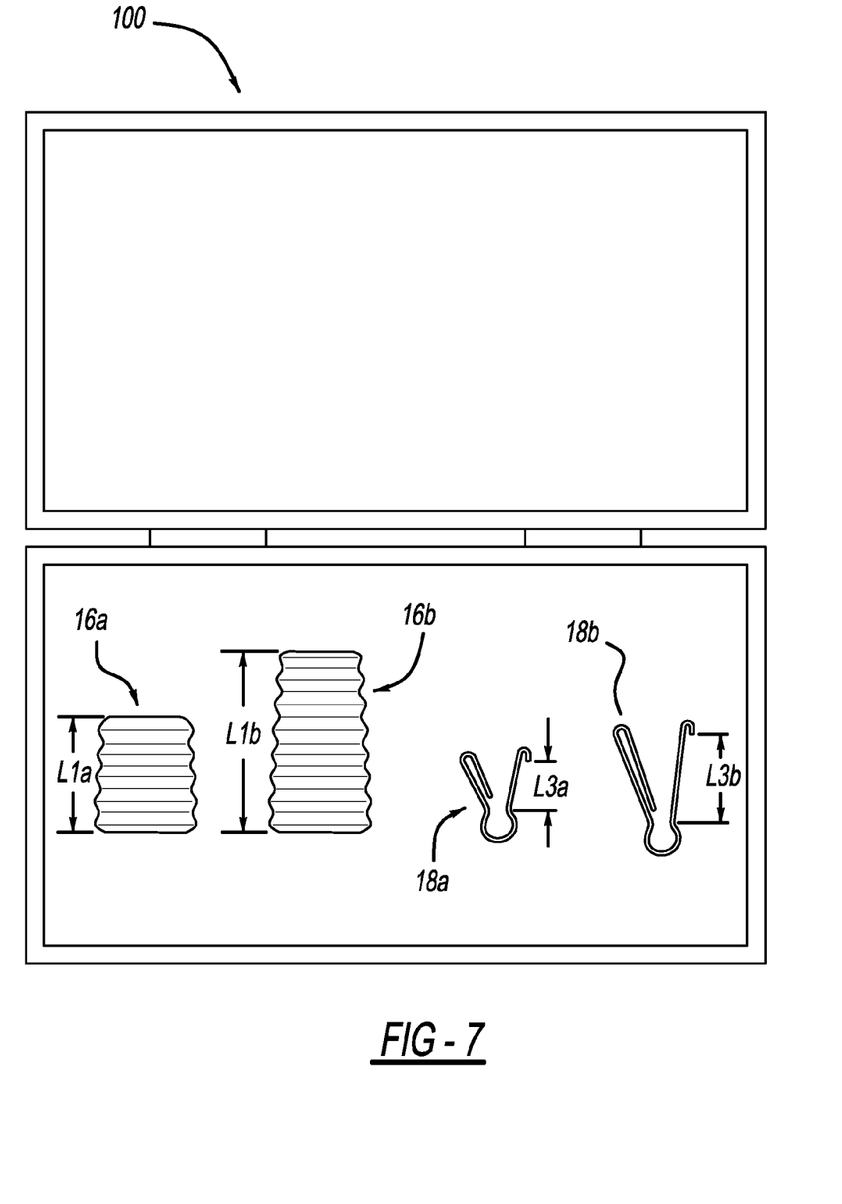
FIG. 7 is a perspective view of a fishing weight assembly kit in accordance with the principles of the present disclosure.

As illustrated in FIG. 7, a fishing weight assembly kit 100 can include various weight members 16 and various clip members 18. In this regard, the kit 100 can include weight members 16 having various lengths L1 and clip members 18 having various lengths L3. For example, the kit 100 may include a first weight member 16a having a length L1a, and a second weight member 16b having a length L1b that is greater than the length L1a. The kit 100 may also include a first clip member 18a having a length L3a, and a second slip member 18b having a length L3b. While the kit 100 is illustrated as having two weight members 16a, 16b and two clip members 18a, 18b, it will be appreciated that the kit 100 may include more than two weight members and clip members within the scope of the present disclosure. By offering weights and corresponding clip members over a range of sizes, the end user can adjust for water depth and different fish types at their destination.

Figure 8:
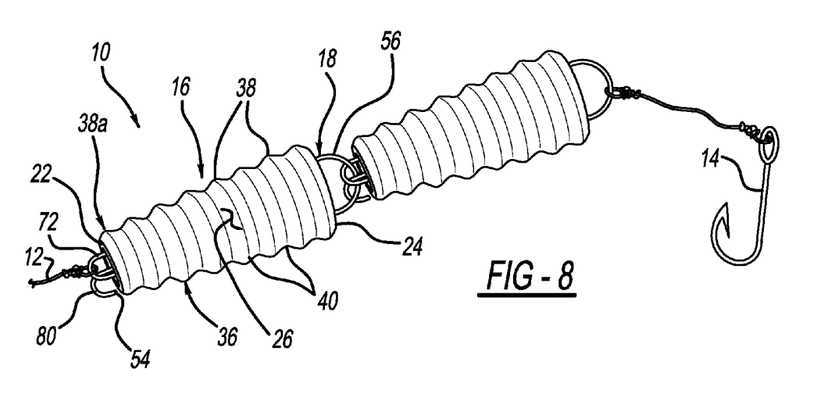
FIG. 8 is a perspective view of a plurality of the fishing weights connected in series.

As illustrated in FIG. 8, a plurality of fishing weight assemblies can be used in combination. In this regard, weight can be added or subtracted as needed. While not shown, it should be understood that weights of different shapes and sizes can be added to a weight assembly according to the present invention.

In an assembled configuration, clip member 18 may be coupled to the weight member 16. In this regard, the first and second arms 58, 60 may be disposed within the aperture 28, such that the base portion 56 of the clip member 18 extends from the distal end 24 of the weight member 16, and the first and second bends 72, 80 of the first and second arms 58, 60, respectively, extend from the proximal end 22 of the weight member 16. In some configurations, the first and second ends 62, 64 of the base member can be disposed within the counterbore 30, adjacent the surface 50. The first end 52 of the clip member 18 may be disposed within the aperture 28. The second end 54 of the clip member 18 may abut, or otherwise face the proximal end 22 of the weight member 16. In this regard, in the assembled configuration, the base portion 56 and the second end 54 of the clip member 18 may prevent the weight member 16 from translating or otherwise moving relative to the clip member 18 in a direction substantially parallel to the axis 32.

In order to use the fishing weight assembly 12, a user may extend the fishing line 12 through the proximal opening 44 in the weight member 16, and subsequently through the aperture 28 and the distal opening 46. The user may couple or otherwise fasten (e.g., tying, clipping, looping, etc.) the fishing line 12 to the first arm 58 of the clip member 18 and fasten the lure 14 to the base portion 56 of the clip member. In this regard, the fishing line 12 may be coupled to the first bend 72 of the first arm 58. The user may bias the first arm 58 relative to the second arm 60 such that the second axis 74 is substantially parallel to the third axis 82. The first and second arms 58, 60 may then be inserted into the distal opening 46 of the weight member 16, and subsequently into the aperture 28, such that the first and second bends 72, 80 extend from the proximal opening 44, and the second end 54 of the clip member 18 abuts the proximal end 22 of the weight member 16. The user may release the first arm 58 relative to the second arm 60, such that the first arm 58 is biased away from the second arm 60. In order to remove or replace the lure 14, the user can remove the clip member 18 from the aperture 28 by biasing the first arm 58 toward the second arm 60, such that the second axis 74 is substantially parallel to the third axis 82, and the second end 54 of the clip member 18 is aligned with the proximal opening 44. The user can move (e.g., push or pull) the clip member 18 through the aperture 28 and the distal opening 46 until the clip member 18 is no longer disposed within the aperture 28. The lure 14 can then be removed and/or replaced with another lure (not shown), or with additional clip and weight members 18, 16, prior to re-assembling with the clip member 18 and the weight member 16 in the manner described above. In this regard, it will be appreciated that a first clip member 18 can be coupled to a second clip member 18 to form a chain or series of clip and weight members 18, 16.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A fishing weight assembly comprising:
    a fishing weight member having a proximal end, a distal end, and an aperture extending from the proximal end to the distal end; and
    a fishing weight support member disposed within the aperture, the fishing weight support member including a base portion extending from the distal end of the fishing weight member, the base portion defining a loop which is larger than the fishing weight member aperture, and first and second arms extending from said base portion, said first arm having an overall u-shape including a first portion and a second portion extending along an entire length of and disposed within said aperture and joined along a U-shaped bend which extends beyond the proximal end of the weight member, said second arm including a first portion extending from said base portion and a second portion extending from said first portion to define a bend, said second portion of said second arm seating along the proximal end of the fishing weight member to assist in securing the support member to the fishing weight member;
    wherein said first and second arms of the support member are pinched together and inserted through the aperture from the distal end to the proximal end of the weight member such that upon releasing the first and second arms after complete insertion through the aperture, the U-shaped bend extends beyond the proximal end of the weight member and the bend of the second arm seats against the proximal end of the weight member; wherein the fishing weight support member is removable from the aperture of the fishing weight member in a direction from the proximal end to the distal end.

2. The fishing weight assembly of claim 1, further comprising a fishing line coupled to the arm first portion of the fishing weight support member.

3. The fishing weight assembly of claim 1, further comprising a lure coupled to the base portion of the fishing weight support member.

4. The fishing weight assembly of claim 1, wherein the fishing weight member includes a corrugated outer surface.

5. The fishing weight assembly of claim 4, wherein the corrugated outer surface includes a first peak defining a first diameter and a second peak defining a second diameter greater than the first diameter.

6. The fishing weight assembly of claim 5, wherein the first peak is adjacent the proximal end of the fishing weight member and the second peak is adjacent the distal end of the fishing weight member.

7. The fishing weight assembly of claim 1, wherein the distal end of the fishing weight member includes a counter-bore portion aligned with the aperture.

8. The fishing weight assembly of claim 1, wherein a second fishing weight is attached to said fishing weight support member.

9. The fishing weight assembly of claim 8, wherein said second fishing weight is a different size than the first fishing weight.

10. The fishing weight assembly of claim 8, wherein the first and second weights are the same size.

11. The fishing weight assembly of claim 1 wherein said aperture is rectangular shaped.

12. The fishing weight assembly of claim 1, further comprising a counter-bore extending between said aperture and said distal end.

13. The fishing weight assembly of claim 1, wherein said fishing weight support member is formed from spring steel.

14. A fishing weight assembly kit comprising:
a first fishing weight member having a proximal end, a distal end, and an aperture extending from the proximal end to the distal end;
a second fishing weight member having a proximal end, a distal end, and an aperture extending from the proximal end to the distal end; and
a fishing weight support member disposed within the aperture of at least one of the first or second fishing weight members, the fishing weight support member including a base portion extending from the distal end of the fishing weight member, the base portion defining a loop which is larger than the fishing weight aperture, and first and second arms extending from said base portion, said first arm having an overall u-shape including a first portion and a second portion extending along an entire length of and disposed within said aperture and joined along a U-shaped bend which extends beyond the proximal end of the weight member, said second arm including a first portion extending from said base portion and a second portion extending from said first portion to define a bend, said second portion of said second arm seating along the proximal end of the fishing weight member to assist in securing the support member to the fishing weight member;
wherein said first and second arms of the support member are pinched together and inserted through the aperture from the distal end to the proximal end of the weight member such that upon releasing the first and second arms after complete insertion through the aperture, the U-shaped bend extends beyond the proximal end of the weight member and the bend of the second arm seats against the proximal end of the weight member; wherein the fishing weight support member is removable from the aperture of.

15. The fishing weight assembly kit of claim 14, wherein at least one of said first and second fishing weight members within which said fishing weight support member is disposed includes a corrugated outer surface.

16. The fishing weight assembly of claim 15, wherein the corrugated outer surface includes a first peak defining a first diameter and a second peak defining a second diameter greater than the first diameter.

17. The fishing weight assembly of claim 16, wherein the first peak is adjacent the proximal end of the fishing weight member and the second peak is adjacent the distal end of the fishing weight member.

18. The fishing weight assembly kit of claim 14, wherein said aperture is rectangular shaped.

19. The fishing weight assembly kit of claim 14, further comprising a counter-bore extending between said aperture and said distal end.

20. The fishing weight assembly of claim 14, wherein said fishing weight support member is formed from spring steel.

* * * * *